United States Patent [19]

Kerber et al.

[11] Patent Number: 4,674,045

[45] Date of Patent: Jun. 16, 1987

[54] FILTER FOR DATA PROCESSING

[75] Inventors: Michael M. Kerber, Cleveland Heights; Carl J. Brunnett, Mayfield Heights, both of Ohio

[73] Assignee: Picker International Inc., Highland Heights, Ohio

[21] Appl. No.: 688,021

[22] Filed: Dec. 31, 1984

[51] Int. Cl.[4] .................... G06F 15/42; G06F 15/35; G06G 7/60

[52] U.S. Cl. ................... 364/414; 364/726; 382/43

[58] Field of Search ............... 364/414, 724, 726, 728; 378/901; 382/6, 42, 43

[56] References Cited

U.S. PATENT DOCUMENTS

| | | | |
|---|---|---|---|
| 4,189,775 | 2/1980 | Inouye et al. | 364/414 |
| 4,197,583 | 4/1980 | Westell et al. | 364/414 |
| 4,205,375 | 5/1980 | Inouye et al. | 364/414 |
| 4,219,876 | 8/1980 | Mizutani et al. | 364/414 |
| 4,282,579 | 8/1981 | Speiser et al. | 364/726 |
| 4,293,912 | 10/1981 | Walters | 364/414 |
| 4,326,252 | 4/1982 | Kohno et al. | 364/414 |
| 4,333,145 | 6/1982 | Heuscher et al. | 364/414 |
| 4,549,265 | 10/1985 | Deckers et al. | 364/414 |
| 4,550,371 | 10/1985 | Glover et al. | 364/414 |

*Primary Examiner*—E. A. Goldberg
*Assistant Examiner*—Patrick W. Foster
*Attorney, Agent, or Firm*—Watts, Hoffmann, Fisher & Heinke Co.

[57] ABSTRACT

An imaging method and apparatus having a new and improved data filter. In one application of the invention computed tomography number inaccuracies are avoided by use of a new filter function derived from discrete points of a truncated spatial domain convolution filter. The points from the truncated convolution filter are fourier transformed to yield a ramp filter with ripple in the spatial frequency domain. Data from a CT scan is filtered with this new filter function and back projected to produce images that do not exhibit CT number inaccuracies.

9 Claims, 4 Drawing Figures

FILTER FOR DATA PROCESSING

TECHNICAL FIELD

The present invention relates to cross-sectional image reconstruction and particularly to a method for processing data in a computed tomography scanner.

BACKGROUND ART

Reconstruction techniques for cross-sectional imaging are known for deriving information concerning the internal structure of a subject. These reconstruction techniques are derived from mathematical reconstruction algorithms utilizing the fact that sensed data corresponds to a line integral of a function taken through a cross-section of interest. These reconstruction algorithms allocate this function across the cross-section in a process known as convolution back projection.

In computed tomography, a patient or subject cross-section of interest is successively scanned from different directions by an x-radiation source to direct X-rays through the cross-section of interest. One or more detectors positioned on an opposite side of the patient from the source obtain intensity readings of the x-radiation after it has passed through the patients. If enough intensity measurements from different directions are obtained, these intensity readings can be utilized to reconstruct an attenuation image of the patient cross-section.

In nuclear magnetic imaging, a structure is placed within a strong magnetic field to align the magnetic dipoles of atoms within the structure. A gradient field is superimposed at different orientations and the field is pulsed to perturb the magnetic moment of the atoms. As the atoms decay from the perturbed to their aligned state they generate fields characteristic of the structure of the atoms. The gradient field causes the atoms within the structure to decay with different characteristics which can be sorted out by a reconstruction process.

Other uses for reconstruction processing are in geology and astronomy. In geology, for example, the internal structure of the earth can be discerned without actually excavating and physically analyzing the exposed structure.

Various procedures have been tried to improve the accuracy of the information obtained using these reconstruction processes. One calibration technique used to enhance image quality in computed tomography involves the scanning and reconstruction of phantoms. Since the structure of the phantom is known the reconstructed image can be compared with the known structure to establish and determine the cause of discrepancies between the reconstructed image and the known structure.

One problem experienced with computed tomography scanners is an inaccuracy in CT numbers. Reconstruction of water phantoms of varying sizes results in the CT numbers of water being off by as much as 90 CT numbers. The CT numbers of the entire image are shifted up or down by this amount. This inaccuracy seems to be dependent upon the size of the object under examination.

One mathematical equation that solves the computed tomography reconstruction problem takes the form of a spatial domain convolution integral followed by an integration known in the art as back projection. The convolution is carried out directly in a spatial domain by taking the projection data from the X-ray detectors and convolving this data with an appropriate convolution kernel.

This spatial domain convolution, in theory, is carried out over the limits of plus and minus infinity. In the past, however, since it is known that the patient occupies a finite region in space this integration was limited to the specific region of interest occupied by the patient.

Commercial fourth generation computed tomography scanners often use fourier transform techniques rather than spatial domain convolution. According to these more recent procedures a fourier transform of the data is performed, this transformed data is multiplied by a filter function, and then the inverse fourier transform is taken. This solution is documented in the literature. See, for example, "Convolution Reconstruction Techniques for Divergent Beams", Herman et al, Comp Biol Med, Permagon Press 1976, Vol 6, pgs. 259-271. The Herman et al paper is incorporated herein by reference.

The filter function used in scaling the fourier transformed data is the fourier transform of the convolution filter used in spatial calculations. The fourier transform of the convolution filter yields a ramp function which begins at zero and increases linearly with frequency to a maximum value. Since the ramp filter function is based upon a fourier transform of a spatial domain convolution filter used with earlier reconstruction techniques, this filter was not considered as a source for the CT number inaccuracies sometimes experienced in CT imaging.

The present invention solves the mathematical inaccuracies observed in performing image reconstruction in the prior art by use of a new filter function for reconstruction imaging. The new filter is generated by transforming a truncated spatial domain convolution filter at discrete points rather than using a continuous fourier transform of the entire convolution filter.

DISCLOSURE OF INVENTION

The present invention improves the accuracy of images reconstructed via the various convolution back projection algorithms of the prior art by use of a new filter function.

In accordance with the invention, a finite spatial domain convolution filter is first defined at a discrete number of points. In a CT application the angular extent of the CT scan and the number of attenuation readings obtained in a CT view define the truncated discrete convolution filter.

Once the convolution filter is defined, a discrete fourier transform is performed, on the array of truncated convolution filter points. This yields a ramp filter function with ripple at low spatial frequencies. This new filter resembles the prior art filter, but has low frequency ripple and in particular has a non-zero DC value (the discrete fourier transform of the spatial domain truncated discrete convolution filter transforms the array of points into the spatial frequency domain).

From the above, it should be appreciated that one object of the invention is an improved imaging capability due to the use of a new and improved filtering method. This and other objects and advantages of the invention will become better understood when a detailed description of the invention in a computed tomography environment is described in conjunction with the accompanying drawings.

BEST MODE FOR CARRYING OUT THE INVENTION

Figure 1:
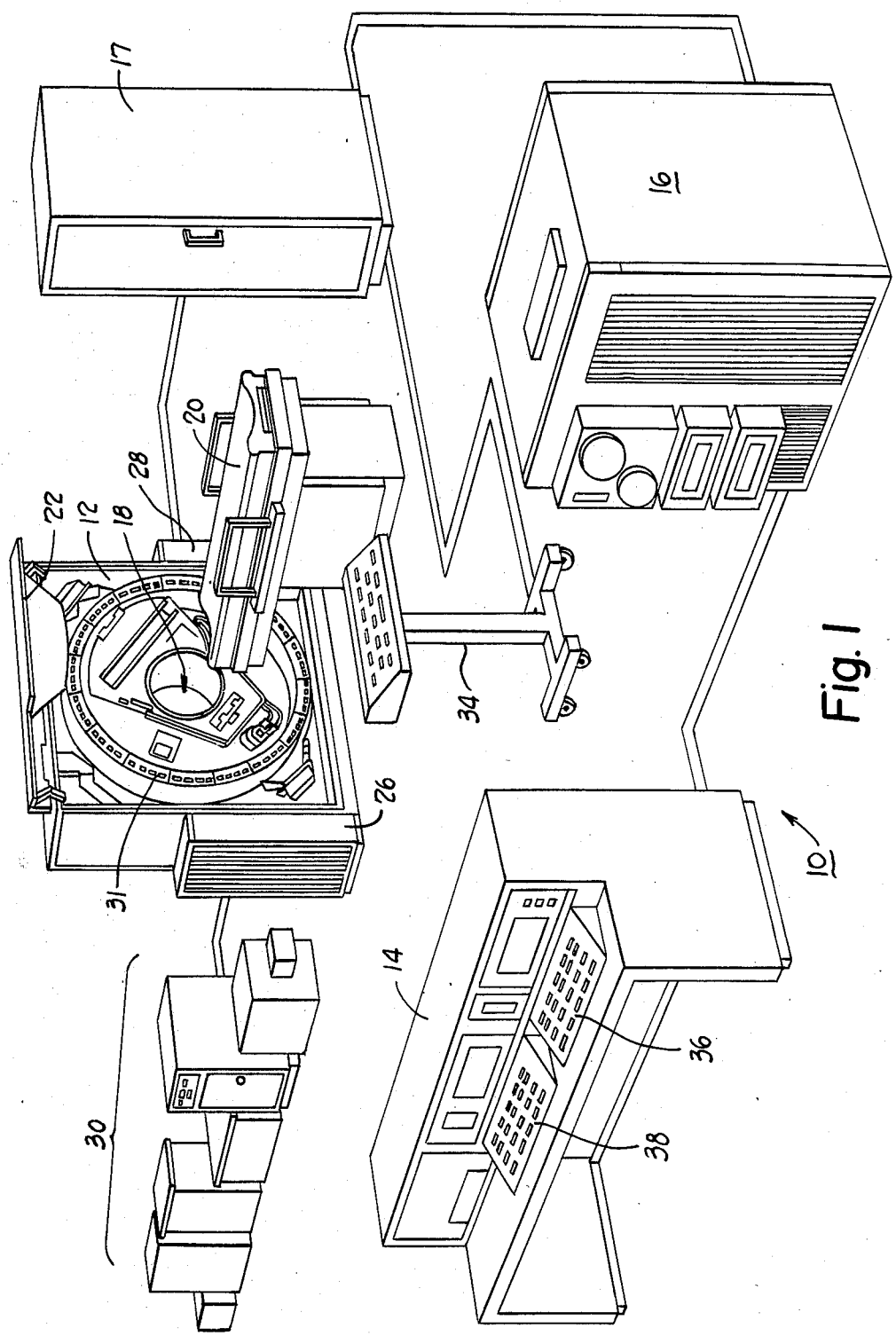
FIG. 1 is a schematic perspective of a CT imaging system.

Turning now to the drawings, FIG. 1 illustrates a computed tomography scanning system 10 used in imaging cross-sectional slices of interest in a patient. The computed tomography system 10 comprises a scanner 12 coupled to a viewing console 14, a computer 16, and specialized electronics 17 needed by the scanner 12 for control and data handling.

The scanner 12 is a fourth generation computed tomography scanner where a fixed array of detectors 31 surrounds a patient aperture 18. During imaging a patient is positioned on a couch 20 and then moved into and through the patient aperture 18 until a cross-sectional slice to be imaged is appropriately positioned. A scanner front panel 22 is hinged to the scanner housing and swings away from the housing to allow the interior of the scanner 12 to be accessed. The scanner housing is supported by a pair of supports 26, 28 and can be tilted about an axis extending through the supports parallel to the floor. In this way, patient cross-sections other than a vertical cross-section can be obtained without repositioning the patient.

A series of electronic subsystems 30 shown to the side of the computed tomography scanner 12 provide voltages suitable for creating x-radiation. In an X-ray tube, highly accelerated electrons are directed to a tube anode from a cathode and in particular electrons having nearly 150,000 electron volts of energy strike the anode to produce x-radiation.

In computed tomography scanning, special electronics 17 analyze intensity values detected by the scanner 12. This specialized electronics 17 counts output pulses from a circular array 31 of scanner detectors as well as controls movement of an X-ray tube and coordinates this movement with the analysis of the output signals. A service module 34 coupled to the electronics 17 allows the scanner 12 to be tested without the aid of the computer 16 or the viewing console 14.

High speed computed tomography scanning is possible only through use of a high speed data processing computer 16. The illustrated and presently preferred computer 16 is a 32 bit Perkin-Elmer mini computer with a disc storage capacity of 320 million bytes. This computer 16 performs the data processing for reconstructing a grid-like image of attenuation variations inside the patient slice from intensity readings taken from the plurality of detectors surrounding the patient aperture. The particular computer chosen is responsible for not only analyzing and reconstructing cross-sectional image densities but also for displaying this information on the console 14.

The console 14 depicted in FIG. 1 includes a first work station 36 for a technician operating the computed tomography apparatus and a second work station 38 for a person responsible for diagnosing the images produced. Although not shown in FIG. 1, a remote viewing station is optionally provided so that the person diagnosing the patient need not be in the same location as the operator.

Each detector in the array comprises a scintillation crystal coupled to a photodiode. In operation, the x-radiation from the X-ray tube impinges upon the scintillation crystal which converts the x-radiation to visible light which in turn affects the current flow in the photodiode. Changes in current produced by the x-radiation are converted from an analog current signal into a sequence of pulses which are counted.

Electronics for generating these pulses in response to current changes in the photodiode are known in the art. The pulses are then counted and divided by the time period in which they are counted to obtain an indication of the intensity of the x-radiation impinging upon the detector at a given time. Circuitry for performing this counting function is disclosed in U.S. Pat. No. 4,052,620 to Brunnett which is assigned to the assignee of the present invention. That prior patent is incorporated herein by reference.

The steps of detecting the radiation 50 and generating the pulses 51 as well as determining the intensity 52 are depicted in a flow chart (FIG. 2) schematically describing the computed tomography process. These three steps 50, 51, 52 are followed by taking the logarithm of the data and a storing 54 of that data in the computer 16. The logarithm of the intensity data yields data proportional to the attenuation the radiation experiences.

The remaining steps in the computed tomography process are performed by the computer 16. The computer first performs a series of calibration and correction calculations 56 on the data. These calculations are based upon data obtained during a CT step-up phase. These calculations take into account variations in detector sensitivity, gain, and offsets in the electronics. Once these calibration steps have been completed, a digital filtering step 58 is performed where all data from each detector is filtered in accordance with a filter defined in accordance with the invention. The filtering process consists of performing a forward fast fourier transform of the data, multiplying the transformed data by a spatial frequency domain filter (FIG. 3) and then performing an inverse fast fourier transform to produce the filtered data.

At a next stage of the computed tomography process, filtered data for those detectors which are not functioning is assigned data 64 based upon the filtered data from those detectors which are supplying valid data. Finally, all data, both from those detectors that are functioning and those which are not, are back projected 66 into a memory to produce an image of a particular patient slice under examination. Once this back projection process has been completed, this data is again stored and utilized in imaging 68 a picture of this slice on the console 14.

Figure 4:
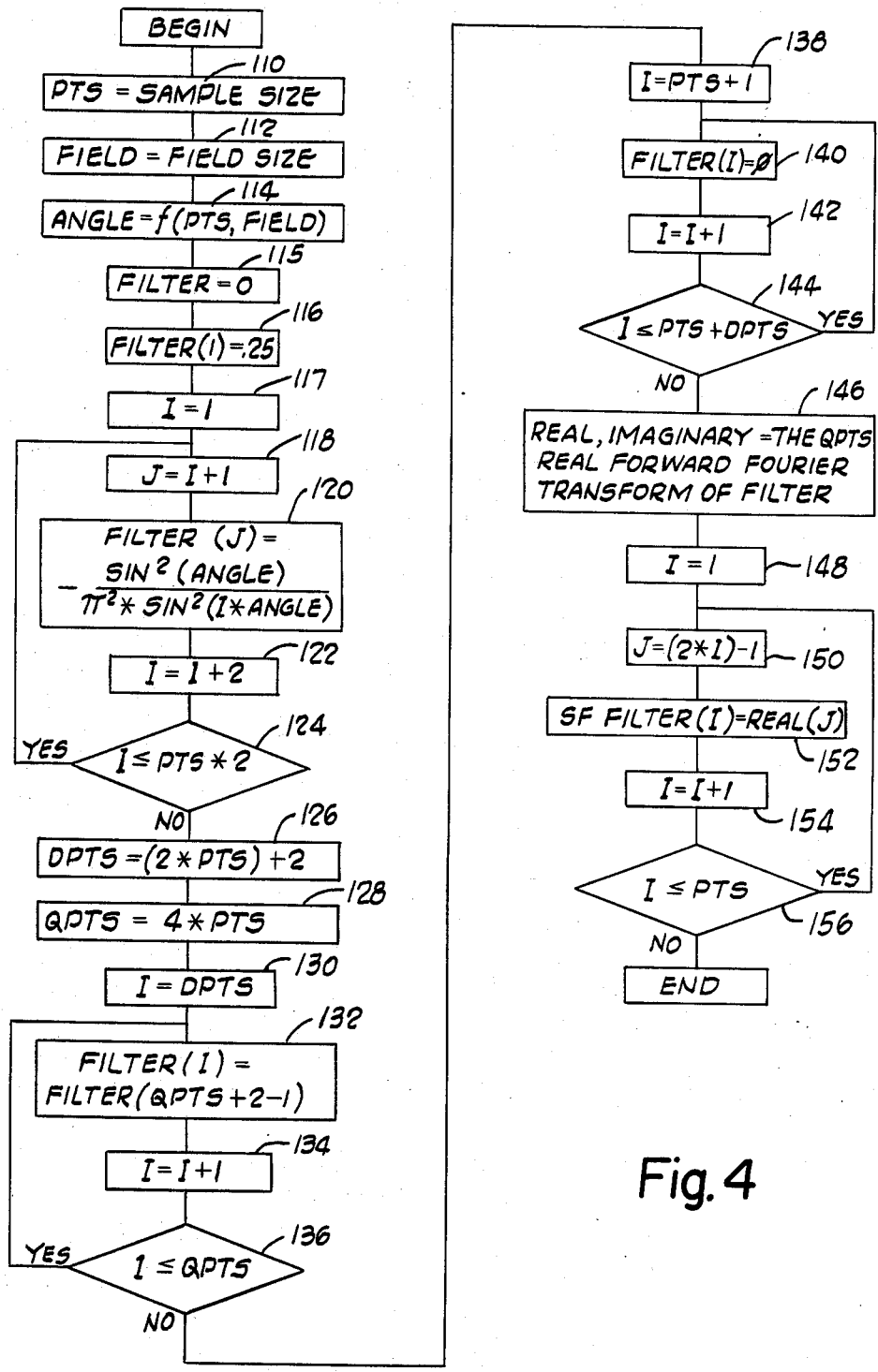
FIG. 4 is a flow chart of the steps in generating a new and improved CT filter function.

Referring now to FIG. 4, a flow chart summarizing the steps in computer generating a filter function are summarized. This filter function is stored and accessed as needed to multiply the transformed data at step 60 in the FIG. 2 flow chart.

The first six steps 110, 112, 114, 115, 116, 117 in the FIG. 4 flow chart are initialization steps. A first step 110 sets a variable labeled PTS equal to the sample size of the data set to be filtered. In one embodiment this sample size is either 512 or 1024 points corresponding to a number of detector intensity readings per view in a fourth generation scanner. At step 112 a variable labeled FIELD is set equal to the field size which is the diameter of the patient scan field. At a next step 114 a variable ANGLE is determined based upon the variable PTS and FIELD. This ANGLE is equal to the angle α defined with reference to the curved detector strip geometry discussed at page 267 of the Herman et al paper. To obtain data in a format such as the curved detector strip described in the paper, data from a Synerview 1200 scanner must be re-fanned.

In preparation for generation of the filter function, an array of variables named FILTER (I) is initialized 115 to zero. The next six steps 116, 117, 118, 120, 122, 124 are steps in generating a truncated convolution kernel. Only a symmetric half of this kernel is generated and it should be noted that all values of FILTER (I) after the first are zero for even values of I. At steps 126 and 128 two variables DPTS, QPTS are initialized and the next four steps 130, 132, 134, 136 produce a symmetric half of the convolution kernel by wrapping the data generated in steps 118, 120, 122 and 124 around a symmetric center point of the FILTER array.

The next four steps 138, 140, 142, 144 truncate the convolution kernel and limit its extent to the geometrical extent of the region of interest within the patient aperture. At the conclusion of step 144 a truncated spatial domain convolution kernel of discrete points has been generated from the equation at step 120. These points are either zero outside the region of interest or defined by the equation in step 120. These are discrete points rather than the continuous convolution kernel utilized in generating a filter function in accordance with the prior art.

Figure 2:
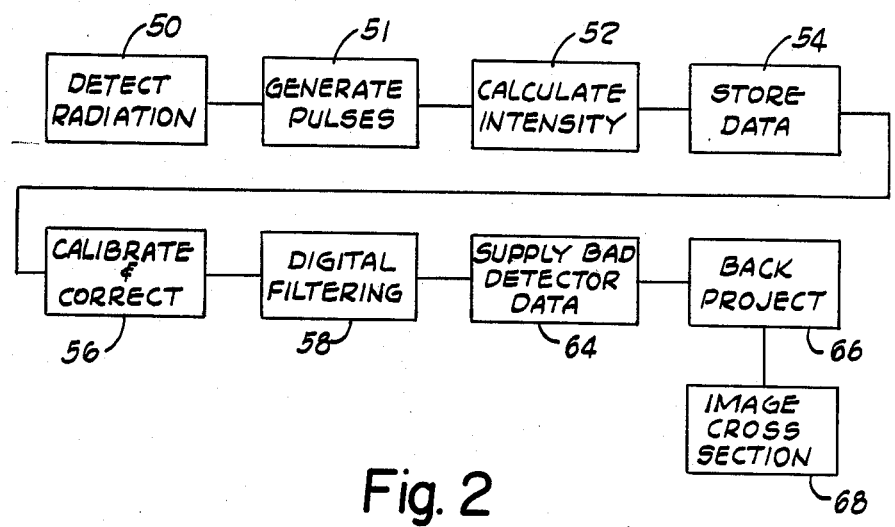
FIG. 2 is a flow chart summarizing the steps of a CT image reconstruction.

At a next step 146 a fast fourier transform of the points defined in the earlier steps is taken to produce a spatial frequency domain filter utilized at the step 60 at FIG. 2. In the remaining steps 150, 152, 154, 156, 158 of the FIG. 4 flow chart the FILTER array is constructed from a real component of this fourier transformed data.

Figure 3:
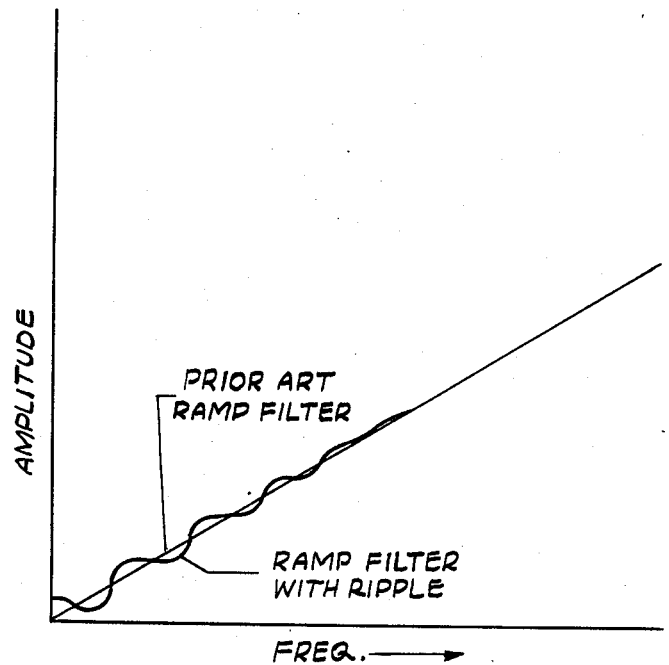
FIG. 3 is a schematic depiction of a prior art linear ramp filter function and a contrasting wavy ramp filter function conforming to the invention.

A graphical representation of this filter is disclosed in FIG. 3. This representation contrasts the prior art filter function which is a ramp function starting at zero and increasing linearly with constant slope. FIG. 3 also illustrates the new and improved filter function which is seen to have low spatial frequency ripple with a finite value at zero frequency. Differences between the ramp filter with ripple of the invention and the prior art ramp filter diminish with frequency. This is illustrated in Table I where normalized filter values are tabulated. For low frequencies the ramp filter with ripple of column two oscillates above and below the linear ramp filter. At high frequencies the two filters coincide so that only a representative few of these filter values have been disclosed in Table I. In practice, these values are attenuated at high frequency to remove the effects of high frequency noise. This high frequency rolloff is known in the computed tomography art.

TABLE I

| | Ramp Filter | Ramp Filter with Ripple |
|---|---|---|
| 1. | 0.000000 | 0.351710 E-03 |
| 2. | 0.195313 E-02 | 0.190772 E-02 |
| 3. | 0.390625 E-02 | 0.392249 E-02 |
| 4. | 0.585938 E-02 | 0.585168 E-02 |
| 5. | 0.781250 E-02 | 0.781735 E-02 |
| 6. | 0.976563 E-02 | 0.976279 E-02 |
| 7. | 0.117188 E-01 | 0.117211 E-01 |
| 8. | 0.136719 E-01 | 0.136705 E-01 |
| 9. | 0.156250 E-01 | 0.156264 E-01 |

TABLE I-continued

| | Ramp Filter | Ramp Filter with Ripple |
|---|---|---|
| 10. | 0.175781 E-01 | 0.175774 E-01 |
| 11. | 0.195313 E-01 | 0.195322 E-01 |
| 12. | 0.214844 E-01 | 0.214839 E-01 |
| 13. | 0.234375 E-01 | 0.234382 E-01 |
| 14. | 0.253906 E-01 | 0.253903 E-01 |
| 15. | 0.273438 E-01 | 0.273443 E-01 |
| 16. | 0.292969 E-01 | 0.292967 E-01 |
| 17. | 0.312500 E-01 | 0.312505 E-01 |
| 18. | 0.332031 E-01 | 0.332030 E-01 |
| 19. | 0.351563 E-01 | 0.351567 E-01 |
| 20. | 0.371094 E-01 | 0.371093 E-01 |
| 21. | 0.390625 E-01 | 0.390629 E-01 |
| 22. | 0.410156 E-01 | 0.410156 E-01 |
| 23. | 0.429688 E-01 | 0.429691 E-01 |
| 24. | 0.449219 E-01 | 0.449219 E-01 |
| 25. | 0.468750 E-01 | 0.468753 E-01 |
| 26. | 0.488281 E-01 | 0.488282 E-01 |
| 27. | 0.507813 E-01 | 0.507815 E-01 |
| 28. | 0.527344 E-01 | 0.527344 E-01 |
| 29. | 0.546875 E-01 | 0.546878 E-01 |
| 30. | 0.566406 E-01 | 0.566407 E-01 |
| 31. | 0.585938 E-01 | 0.585940 E-01 |
| 32. | 0.605469 E-01 | 0.605470 E-01 |
| 33. | 0.625000 E-01 | 0.625002 E-01 |
| 34. | 0.644531 E-01 | 0.644532 E-01 |
| 35. | 0.664063 E-01 | 0.664065 E-01 |
| 36. | 0.683594 E-01 | 0.683595 E-01 |
| 37. | 0.703125 E-01 | 0.703127 E-01 |
| 38. | 0.722656 E-01 | 0.722657 E-01 |
| 39. | 0.742188 E-01 | 0.742190 E-01 |
| 40. | 0.761719 E-01 | 0.761720 E-01 |
| 41. | 0.781250 E-01 | 0.781252 E-01 |
| 42. | 0.800781 E-01 | 0.800782 E-01 |
| 43. | 0.820313 E-01 | 0.820315 E-01 |
| 44. | 0.839844 E-01 | 0.839845 E-01 |
| 45. | 0.859375 E-01 | 0.859377 E-01 |
| 46. | 0.878906 E-01 | 0.878907 E-01 |
| 47. | 0.898438 E-01 | 0.898439 E-01 |
| 48. | 0.917969 E-01 | 0.917970 E-01 |
| 49. | 0.937500 E-01 | 0.937502 E-01 |
| 50. | 0.957031 E-01 | 0.957032 E-01 |
| 51. | 0.976563 E-01 | 0.976564 E-01 |
| 52. | 0.996094 E-01 | 0.996095 E-01 |
| 53. | 0.101563 | 0.101563 |
| 54. | 0.103516 | 0.103516 |
| 55. | 0.105469 | 0.105469 |
| 56. | 0.107422 | 0.107422 |
| 57. | 0.109375 | 0.109375 |
| 81. | 0.156250 | 0.156250 |
| 105. | 0.203125 | 0.203125 |
| 129. | 0.250000 | 0.250000 |
| 154. | 0.296875 | 0.296875 |
| 512. | 1.000000 | 1.000000 |

Utilizing this new filter function to scale or multiply transformed data from the detectors produces computed tomography images in close agreement with phantom images. Images produced using the new filter function do not exhibit the object size dependent CT number inaccuracies of the prior art.

The present invention has been described with a degree of particularity. The number of points comprising the convolution filter and the variables limiting the extent of that convolution filter can be varied to optimize CT image quality. In a preferred mode the filter values are stored in computer memory and the actual filtering performed by a dedicated array processor within the computer 16. It is the intent that the invention include all modifications and/or alterations in the disclosed embodiment falling within the spirit or scope of the appended claims.

We claim:

1. A method in reconstruction imaging comprising the steps of:
obtaining data from a subject cross-section of interest;

converting said data in accordance with a reconstruction algorithm to convert said data from a spatial to a spatial frequency domain;

filtering data that has been converted to the spatial frequency domain with a spatial frequency domain filter having an amplitude that increases non linearly with frequency and deviates above and below a linear ramp filter function with deviations from the linear ramp filter function that diminish with frequency; and converting filtered data back to a spatial domain and back projecting said data over a subject region of interest to provide a mapping of structure within the cross-section of interest.

2. In reconstruction imaging where data from a subject is sensed a number of times to form a data set, a method for processing said data prior to back projection of said data to form an image comprising the steps of performing an fourier transform on said data to convert said data from a spatial to a spatial frequency domain, filtering said spatial frequency domain data with a spatial frequency domain filter function, and performing an inverse fourier transform on said filtered data to re-convert said data into the spatial domain, said spatial frequency domain filter function derived from a spatial domain convolution filter by fourier transforming discrete points of said convolution filter to produce a spatial frequency domain filter function that oscillates above and below a linear ramp function with deviations from the linear ramp function decreasing with increasing frequency in a damped manner.

3. The method of claim 2 where said spatial frequency domain filter comprises a real component of said fourier transformed spatial domain convolution filter.

4. A method in computed tomography imaging comprising the steps of:

obtaining tissue attenuation data from radiation passing through a subject cross-section of interest;

modifying said attenuation data in accordance with a reconstruction algorithm to convert said attenuation data from a spatial to a spatial frequency domain;

filtering data converted to the spatial frequency domain with a spatial frequency domain filter that comprises a non linear function increasing from a non zero value at zero frequency and that deviates above and below a linear ramp function in a damped oscillatory manner so that deviations from the linear ramp function decrease with higher frequencies; and converting said filtered data back to a spatial domain and back projecting said data over a subject region of interest to provide a tissue attenuation mapping.

5. In computed tomography imaging where radiation from a source is caused to impinge upon a patient from a number of directions, a method for processing attenuation data prior to back projection of said data to form an attenuation mapping comprising the steps of performing a fourier transform on said attenuation data to convert said data from a spatial to a spatial frequency domain, filtering said spatial frequency domain data with a spatial frequency domain filter function, and performing an inverse fourier transform on said filtered data to re-convert said data into the spatial domain, said filter derived by fourier transforming discrete points of a spatial domain convolution filter to produce a nonlinear spatial frequency domain filter function that increases with frequency and oscillates above and below a linear ramp filter as said frequency increases.

6. The method of claim 5 where said spatial frequency domain filter comprises a real component of said fourier transformed spatial domain convolution filter.

7. Computerized tomography scanning apparatus for imaging a cross-sectional slice of a subject comprising:

an array of closely spaced radiation sensing detectors;

a radiation source mounted to direct radiation through said subject to said detector array from a number of positions;

means for storing radiation intensity data after the radiation has been attenuated by said subject and sensed by the detector array;

means for transforming the intensity data from the detectors to create a reconstructed computed tomography image and for presenting said image in a form for discerning attenuation variations in the cross-sectional slice; said means for transforming including (i) means for fourier transforming said intensity data from a spatial to a spatial frequency domain; (ii) means for filtering said transformed data with a ramp filter function with ripple that increases from a non-zero value at zero frequency and where deviations between a linear ramp function and the ramp filter function with ripple are damped with increasing frequency; (iii) means for performing an inverse fourier transform on data that has been filtered by the ramp filter function with ripple and (iv) means for backprojecting data to create an image of the cross-sectional slice.

8. The apparatus of claim 7 where the means for transforming includes a computer having an array processor for sequentially accessing attenuation data that has been fourier transformed into a spatial frequency domain and filtering said data with the ramp filter with ripple function.

9. The apparatus of claim 8 where the array of detectors is stationary with respect to said subject and source orbits around the subject.

* * * * *